April 23, 1946.    P. J. UDELL    2,398,978
STRAINER
Filed April 3, 1944

INVENTOR
PHILIP J. UDELL

ATTORNEY

Patented Apr. 23, 1946

2,398,978

UNITED STATES PATENT OFFICE 2,398,978

STRAINER

Philip J. Udell, Chicago, Ill.

Application April 3, 1944, Serial No. 529,320

6 Claims. (Cl. 210—163.5)

The invention relates to pouring strainers and particularly to one that is easily and quickly attached to or detached from containers of various sizes.

The strainer of the present invention is of a kind which is particularly useful when it is desired to separate solids from liquids, such as for example, in pouring off the water in which potatoes or the like have been cooked. A common known practice is to hold the lid of a container, such as a pot, slightly out of register with the pot opening and then tip the pot so as to allow the water to run off. This, of course, is a make-shift and dangerous procedure because steam rising from the water may cause serious injury to the arm or hand used in holding the cover. It is, therefore, an object of the present invention to provide a novel strainer of a kind which may be easily and quickly attached to the pot and one which may be quickly removed after the liquid contents has been poured off.

A strainer of the kind exemplified herein must necessarily be suitable for attachment to pots of various sizes for otherwise its use would be strictly limited. Hence, it is another object of the invention to provide a strainer of a kind which is adjustable in size so as to be equally useful on pots of various sizes.

Still another object of the invention is to provide a strainer of the kind disclosed with means to prevent it from falling off and in which such means is self-adjusting so as to make it unnecessary to manipulate securing elements of any kind whatsoever.

A further object is to provide a device of the character to which this invention pertains which is not expensive to manufacture and which will withstand the abuse of normal usage and is easy to clean.

Other and further objects of the present invention will be apparent from the following description and claims and are illustrated in the accompanying drawing, which by way of illustration shows a preferred embodiment and the principles thereof and which is now considered to be the best mode contemplated for applying that principle. Other embodiments of the invention embodying the same or equivalent principle may be used and structural changes may be made by those skilled in the art without departing from the present invention and the purview of the appended claims.

Figure 1:
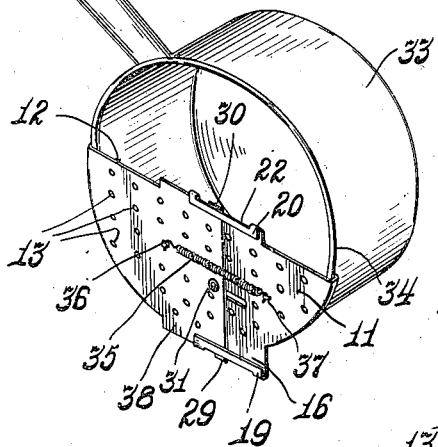
Fig. 1 is a perspective view showing a pot having a strainer embodying features of the invention attached thereto.

Strainers of the kind embodying features of the present invention are adapted to be detachably secured readily to the open side of a container or pot so as to facilitate the pouring of the liquid contents therefrom without spilling any solids therein contained. An example of such use may consist in separating and pouring of juices from the pulp after berries or the like have been cooked.

As shown, the strainer consists of a pair of substantially like perforated flat pieces of sheet material 11 and 12, perforated as at 13 and assembled in a manner that will enable one of the pieces to slide freely over the face of the other of said pieces so as to thereby provide in effect a unitary structure capable of having its overall size varied to suit various requirements of use as will be explained presently.

The piece of material 11 is substantially square in outline and at least a part of the length of one of its side edges is formed arcuate, as at 14, to thereby define a main body portion 15 and an end extension 16 of reduced width. The margin of the arcuate edge 14 is turned downwardly to provide a depending flange 17 substantially at right angles to a plane of the portion 15, and then inwardly so as to provide a lip 18 on the lower edge of said flange. The opposed parallel end edges of the piece 11 are each provided with an upwardly and inwardly folded marginal portion or flange 19 and 20 respectively, and said flanges are severed in part from the body of the sheet, inwardly of their ends, so as to provide elongated slots 21 and 22 respectively, therein.

The other plate 12 is shaped like the plate 11 and has one of its side edges formed arcuate, as at 23, which arcuate edge similarly has its margin turned downwardly, as at 24, to provide a depending flange, substantially at right angles to the plane of the body 12, having its lower edge turned inwardly to provide a lip 25. The parallel end edges 26 and 27 of the plate 12 are each provided adjacent the straight side edge 28 with substantially square extensions or tongues 29 and 30 respectively, which lugs are engaged in the slots 21 and 22 respectively of the other plate 11 when the parts are assembled.

It should be noted at this time that the length of the plate 12, as determined by the edges 26 and 27, is but slightly less than the distance between the two upwardly and inwardly turned margins 19 and 20 of the companion plate 11. As a result, when the two plates are assembled and secured together in a manner to be described in detail presently, the plate 12 will slide freely over the plate 11 and is guided against being canted by reason of abutment of its edges 26 and 27 with the folded over margins 19 and 20 respectively. The extent of such sliding movement is, of course, limited by the length of the slots 21 and 22. The two plates 11 and 12 are additionally secured together so as to prevent any possibility of their becoming separated inadvertently by means of a headed rivet 31, which is permanently secured to either of the plates 11 or 12 and which extends through a slot 32 in the other of said plates so as to enable said plates to be moved one relative to the other.

Figure 2:
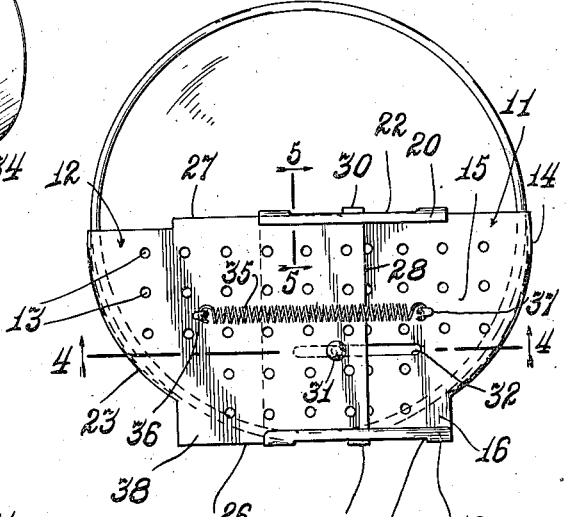
Fig. 2 is a top plan view of the strainer showing it applied to a pot.
Figure 4:
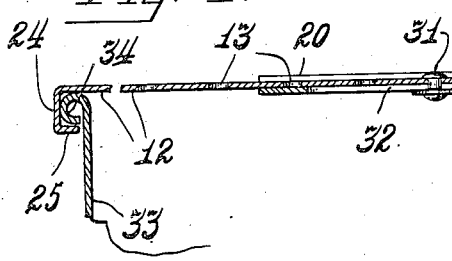
Fig. 4 is a sectional detail view taken substantially on line 4—4 of Fig. 2.
Figure 3:
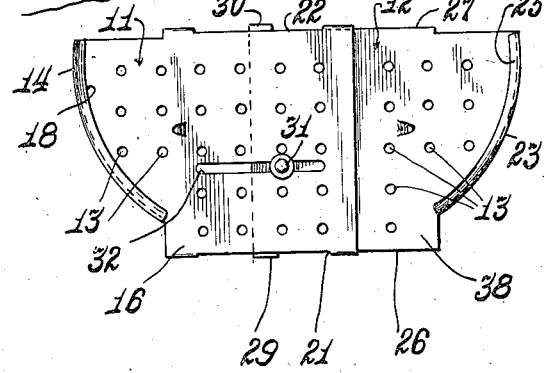
Fig. 3 is a bottom plan view of the strainer.
Figure 5:
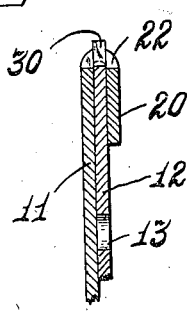
Fig. 5 is a sectional detailed view taken on line 5—5 of Fig. 2.

In use, the plates 11 and 12 are placed over a portion of the open side of a container, such as the pot 33 best illustrated in Figs. 1 and 2, and is arranged in such position that its arcuate edges 14 and 23 respectively, register substantially with that portion of the beaded pot edge 34 so as to permit the inwardly turned lips 18 and 25 on said arcuate edges to engage beneath the bead 34 when the two plates 11 and 12 are moved one towards the other. It is preferred that movement of the plates 11 and 12 towards each other or into what might be termed a collapsed or compact relation is best assured by providing a tension spring or the like, such as a coil spring 35 thereon, which may have its ends securely anchored to the plates 11 and 12 respectively by engagement over suitable lugs 36 and 37 respectively.

It should be evident at this time that the strainer is, at all times, held tightly in place on the open top side of the pot 33 and that it will remain in place notwithstanding pressure exerted by the weight of any of the contents of the container which might be thrust thereagainst while the container is inverted or partially inverted during a pouring operation. The spring 35 further makes the device useful on pots or containers of any size within the limits of contraction or expansion of said device as determined by the length of the slots 21, 22 and 32.

Removal of the device after use may be accomplished very easily, irrespective of whether or not the device has become heated, by simply grasping either or both of the projecting portions 16 on the plate 11 or the companion portion 38 on the plate 12 and then sliding the device outwardly off from over the opening.

Although an exemplary form of the invention has been illustrated and described, it is to be understood that the invention is not intended to be limited to the details of the disclosure but is intended to embrace such modifications as fall within the scope of the appended claims.

I claim:

1. A container having an external flange surrounding its opening, a strainer disposed over said opening and having means engaging said flange to retain it in place, said strainer consisting of two substantially like perforated sheets disposed in overlapping relationship, guides on opposite edges of one of said sheets to receive the complemental margins of the other sheet, a slotted opening in each of said guides, and a tongue on each of the embraced edges of the other sheet extending through said respective slotted openings so as to limit relative sliding movement of the sheets.

2. A container having an external flange surrounding its opening, a strainer disposed over said opening and having means engaging said flange to retain it in place, said strainer consisting of two substantially like perforated sheets disposed in overlapping relationship, guides on opposite edges of one of said sheets to receive the complemental margins of the other sheet, a slotted opening in each of said guides, a tongue on each of the embraced edges of the other sheet extending through said respective slots so as to limit relative sliding movement of the sheets, and a spring common to both of said sheets to retain them normally overlapped to the fullest extent permitted by said slots.

3. A container having an external flange surrounding its opening, a strainer disposed over said opening, said strainer consisting of two substantially like perforated sheets disposed in overlapping relationship, guides on opposite edges of one of said sheets to receive the complemental margins of the other sheet, a slotted opening in each of said guides, a tongue on each of the embraced edges of the other sheet extending through said respective slots so as to limit relative sliding movement of the sheets, a spring common to both of said sheets to retain them normally overlapped to the fullest extent permitted by said slots, and downwardly and inwardly disposed flanges on the margins of each sheet opposite to the overlapped portions to embrace the external flange surrounding said opening to thereby retain the strainer on the container.

4. A container having an external flange surrounding its opening, a strainer disposed over said opening and having means engaging said flange to retain it in place, said strainer consisting of two substantially like perforated sheets disposed in a partly overlapping relationship, guides on opposite edges of one of said sheets to receive the complemental margins of the other sheet, a pin and slot connection between said sheets, and a spring common to both of said sheets to retain them normally overlapped to the fullest extent permitted by the pin and slot connection.

5. A container having an external flange surrounding its opening, a strainer disposed over said opening, said strainer consisting of two substantially like perforated sheets having a combined area less than the area of the opening and being disposed in overlapping relationship, guides on opposite edges of one of said sheets to receive the complemental margins of the other sheet, a slot in each of said guides, a tongue on each of the embraced edges of the other sheet extending through said respective slots so as to limit relative sliding movement of the sheets, a pin and slot connection between said sheets, and downwardly and inwardly disposed flanges on the margins of each sheet opposite to the overlapped portions to embrace the external container flange to thereby retain the strainer on the container.

6. A strainer of a kind adapted to be laid over the top of a container opening formed with an external surrounding flange, comprising, two substantially like flat pieces of material having a plurality of perforations therein, said flat pieces being arranged relative to each other with an area of one piece overlapping an area of the other piece, inwardly turned flanges one on each opposite edge of one of said pieces, said flanges overlying opposite margins of the other piece and being cut away in part intermediate their ends to define slots, a tongue on each of said margins one arranged to extend through each of said slots to limit relative movement of the pieces, a pin and slot connection in said overlapping areas securing said pieces together, a lip on at least a portion of an edge of each piece opposite to the overlapped areas, and a spring arranged to pull said pieces towards one another into greater overlapping relation so as to cause the lips to engage the container flange and retain the strainer over said opening.

PHILIP J. UDELL.